United States Patent
Kim et al.

(10) Patent No.: US 12,409,503 B2
(45) Date of Patent: Sep. 9, 2025

(54) METHOD FOR WELDING HALF COIL OF REACTOR

(71) Applicants: Yuchan Kim, Changwon-si (KR); Taewan Kim, Changwon-si (KR)

(72) Inventors: Yuchan Kim, Changwon-si (KR); Taewan Kim, Changwon-si (KR)

(73) Assignee: BESTFA CO., LTD., Changwon-si (KR)

( * ) Notice: Subject to any disclaimer, the term of this patent is extended or adjusted under 35 U.S.C. 154(b) by 646 days.

(21) Appl. No.: 17/881,477

(22) Filed: Aug. 4, 2022

(65) Prior Publication Data
US 2023/0045091 A1 Feb. 9, 2023

(30) Foreign Application Priority Data
Aug. 4, 2021 (KR) .......................... 10-2021-0102436

(51) Int. Cl.
| | |
|---|---|
| *B23K 9/00* | (2006.01) |
| *B23K 9/173* | (2006.01) |
| *B23K 9/235* | (2006.01) |
| *B23K 35/38* | (2006.01) |

(52) U.S. Cl.
CPC ............ *B23K 9/0026* (2013.01); *B23K 9/173* (2013.01); *B23K 9/235* (2013.01); *B23K 35/383* (2013.01)

(58) Field of Classification Search
CPC ...... B23K 9/0026; B23K 9/173; B23K 9/235; B23K 35/383
USPC .............................................. 219/137 R, 136
See application file for complete search history.

(56) References Cited

U.S. PATENT DOCUMENTS 4,491,718 A * 1/1985 Cook ................... B23K 9/0216
219/124.22

FOREIGN PATENT DOCUMENTS

| | | | | |
|---|---|---|---|---|
| IT | 1193263 B | * | 6/1988 | |
| JP | 1998216933 A | | 8/1998 | |
| KR | 10-0438324 B | | 7/2004 | |
| KR | 10-1141404 B | | 5/2012 | |
| KR | 10-2012-0132918 A | | 12/2012 | |
| KR | 101683444 B1 | * | 12/2016 | |
| WO | WO-2014077567 A1 | * | 5/2014 | ............... B01J 19/18 |

* cited by examiner

*Primary Examiner* — Eric S Stapleton
*Assistant Examiner* — Yeong Juen Thong
(74) *Attorney, Agent, or Firm* — PARK LAW FIRM

(57) ABSTRACT

The present invention relates to a method for welding a half coil of a reactor, which performs the gas metal arc welding (GMAW) along a half coil temporarily welded to a welding machine body using an automatic welding machine to increase a formation amount of back beads, thereby increasing coupling strength of the half coil, increasing airtightness of a fluid flowing along the half coil, securing uniform welding quality by automatic welding, increasing productivity, and reducing production costs.

3 Claims, 5 Drawing Sheets

METHOD FOR WELDING HALF COIL OF REACTOR

BACKGROUND OF THE INVENTION

Field of the Invention

The present invention relates to a method for welding a half coil of a reactor, and more specifically, to a method for welding a half coil of a reactor, which performs the gas metal arc welding (GMAW) along a half coil temporarily welded to a welding machine body using an automatic welding machine to increase a formation amount of back beads, thereby increasing coupling strength of the half coil, increasing airtightness of a fluid flowing along the half coil, securing uniform welding quality by automatic welding, increasing productivity, and reducing production costs.

Background Art

In general, a reactor refers to a tank-shaped container used to perform a chemical reaction. Reactors are classified according to structures of the reactors into a jacket reactor having a jacket formed on the outside of the reactor, a flange reactor having a flange formed on the reactor to increase a joining force with a raw material pipe, an in-coil reactor having a coil mounted therein so that fluid can flow therethrough, and a half coil reactor having a half coil welded onto the outside.

As illustrated in FIG. 1, a plurality of half coils are mounted along the circumferential surface of a reactor body 1, and such a half coil 2 is fixed on the reactor body by welding.

As illustrated in FIG. 3, in a case of a conventional method of fixing a half coil to a reactor body, a person has to directly weld each of half coils. So, the conventional method has several disadvantages in that welding quality is deteriorated due to an uneven production amount of beads, in that fluid flowing along the half coil leaks when there is a unwelded portion, and in that manufacturing costs rise sharply since requiring lots of production time.

Moreover, in the case of the reactor body, a flat steel plate is wound in a circular shape, and a half coil is manufactured by bending a pipe 3 material (FIG. 2B) and parting the bents pipe by cutting about a half of the bent pipe by a cutter or a grinder (FIG. 2C) as illustrated in FIG. 2A to FIG. 2D. Therefore, it is difficult to produce products with accurate dimensions, and it makes welding work more difficult since there is a gap, in dimension between the reactor body and the half coil.

Meanwhile, as a conventional art related to gas metal arc welding (GMAW), Korean Patent Laid-open No. 10-2012-0131563 discloses a butt joint GMAW root pass welding method.

The above conventional art proposes a butt joint GMAW root pass welding method to overcome a root gap change and stably form back beads by controlling a relative arc force, and a butt joint GMAW root pass welding method to overcome a root gap change and stably form back beads by controlling a relative arc force characterized by increasing the relative arc force when a root gap is decreased and decreasing the relative arc force when the root gap is increased. The above conventional art can stably form back beads while overcoming a change of a root gap generated by controlling the relative arc force during butt joint. However, it is difficult to apply it to actual welding since it is difficult to change the control of the relative arc force according to the gap during actual welding.

Furthermore, in relation to another conventional art related to the GMAW method, Korean Patent No. 10-2206082 discloses a titanium-based material welding method using a GMAW method.

The titanium-based material welding method using a GMAW method includes the steps of: (a) preparing a titanium-based material having a titanium oxide layer formed on the surface of a welded portion; and (b) welding the welded portion on which the titanium oxide layer is formed, wherein the titanium oxide layer in the step (a) is formed by drying after applying paste containing titanium oxide powder onto the welded portion or by coagulating after locally melting the surface of the welded portion in an oxidation atmosphere or in the atmosphere using a heat source to input heat energy. Since the titanium oxide layer must be formed on the base material, the method requires lots of time and costs due to preprocessing.

PATENT LITERATURE

Patent Documents

Patent Document 1: Korean Patent Laid-open No. 10-2012-0131563 (published on Dec. 5, 2012)
Patent Document 1: Korean Patent No. 10-2206082 (granted on Jan. 22, 2021)

SUMMARY OF THE INVENTION

Accordingly, the present invention has been made to solve the above-mentioned problems occurring in the prior arts, and it is an object of the present invention to provide a method for welding a half coil of a reactor, which performs the gas metal arc welding (GMAW) along a half coil temporarily welded to a welding machine body using an automatic welding machine to increase a formation amount of back beads, thereby increasing coupling strength of the half coil, increasing airtightness of a fluid flowing along the half coil, securing uniform welding quality by automatic welding, increasing productivity, and reducing production costs.

It is another object of the present invention to provide a method for welding a half coil of a reactor, which can perform welding while performing a weaving operation of a welding nozzle at a constant width in a radial direction of a half coil, thereby increasing a formation amount of back beads.

It is a further object of the present invention to provide a method for welding a half coil of a reactor, which provides dwell time in a state in which the welding nozzle approaches the half coil proximately, thereby increasing a formation amount of back beads.

It is a still further object of the present invention to provide a method for welding a half coil of a reactor in which purging tape is adhered between the half coil, which is temporarily welded in proximity to the half coil being welded actually, and the reactor body to prevent protective gas from leaking through a gap, thereby preventing oxidation of the welded portion.

To accomplish the above object, according to the present invention, there is provided a method for welding a half coil of a reactor including: a temporarily welding step of temporarily welding a half coil onto a circumferential surface of a reactor body; and a GMAW step of performing gas metal arc welding (GMAW) on the half coil after the temporary welding is finished, wherein the GMAW step is to perform welding to prevent a gap from forming between the half coil and the reactor body using the GMAW which supplies a wire of the same material as the reactor body using an automatic welding machine.

According to the present invention, the method for welding a half coil of a reactor performs the gas metal arc welding (GMAW) along a half coil temporarily welded to a welding machine body using an automatic welding machine to increase a formation amount of back beads, thereby increasing coupling strength of the half coil, increasing airtightness of a fluid flowing along the half coil, securing uniform welding quality by automatic welding, increasing productivity, and reducing production costs. Moreover, the method for welding a half coil of a reactor according to the present invention can perform welding while performing a weaving operation of a welding nozzle at a constant width in a radial direction of a half coil, thereby increasing a formation amount of back beads. Furthermore, the method for welding a half coil of a reactor according to the present invention provides dwell time in a state in which the welding nozzle approaches the half coil proximately, thereby increasing a formation amount of back beads. Additionally, the method for welding a half coil of a reactor according to the present invention includes purging tape adhered between the half coil, which is temporarily welded in proximity to the half coil being welded actually, and the reactor body to prevent protective gas from leaking through a gap, thereby preventing oxidation of the welded portion.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

The present invention relates to a method for welding a half coil of a reactor, and more specifically, to a method for welding a half coil of a reactor, which performs the gas metal arc welding (GMAW) along a half coil temporarily welded to a welding machine body using an automatic welding machine to increase a formation amount of back beads, thereby increasing coupling strength of the half coil, increasing airtightness of a fluid flowing along the half coil, securing uniform welding quality by automatic welding, increasing productivity, and reducing production costs.

Hereinafter, a preferred embodiment of the present invention will be described in detail with reference to the accompanying drawings.

Figure 1:
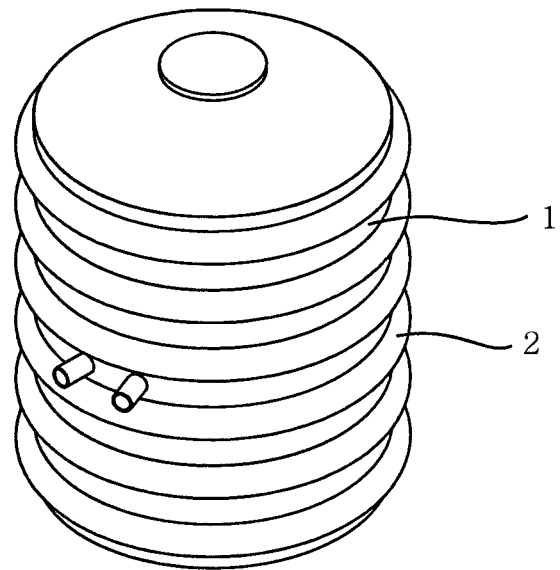
FIG. 1 is a schematic diagram illustrating a half coil reactor.
Figure 2A:
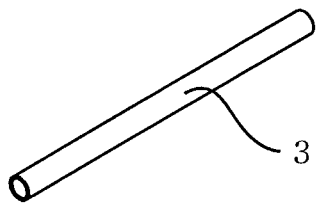
FIG. 2A to 2D is a schematic view illustrating a manufacturing process of a half-coil reactor.
Figure 2B:
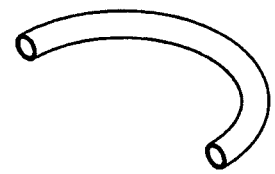
Figure 2C:
Figure 2D:
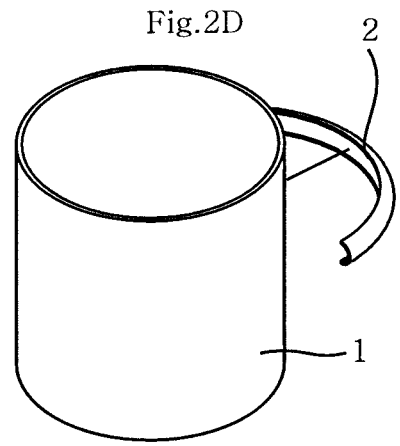
Figure 3:
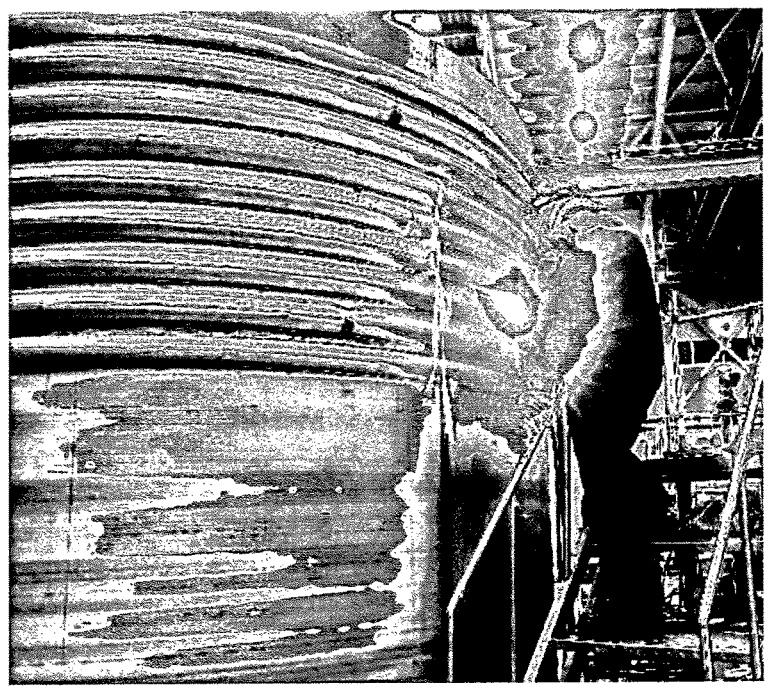
FIG. 3 is a photograph of a conventional half coil.
Figure 4A:
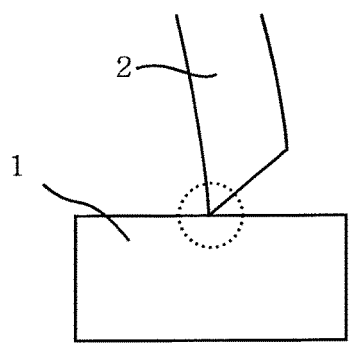
FIG. 4A to 4C is an enlarged cross-sectional view of a reactor body and a portion of a half coil.
Figure 4B:
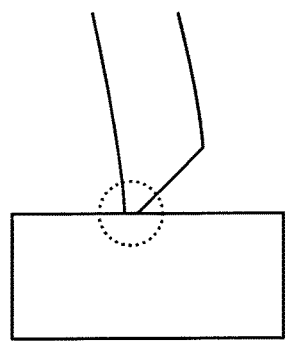
Figure 4C:
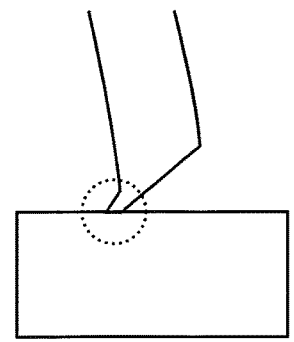
Figure 5:
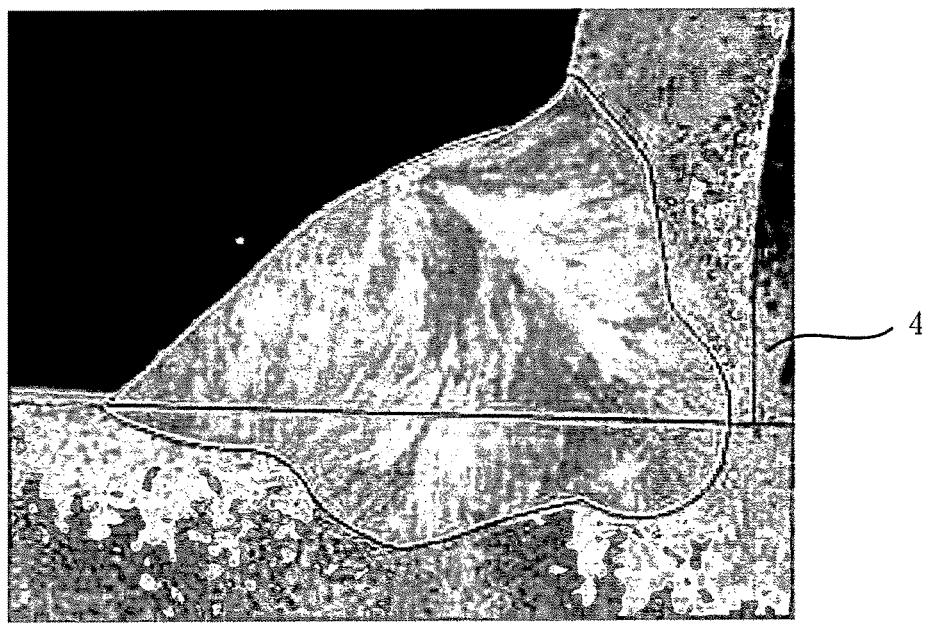
FIG. 5 is an enlarged cross-sectional view after a temporarily welding step.
Figure 6:
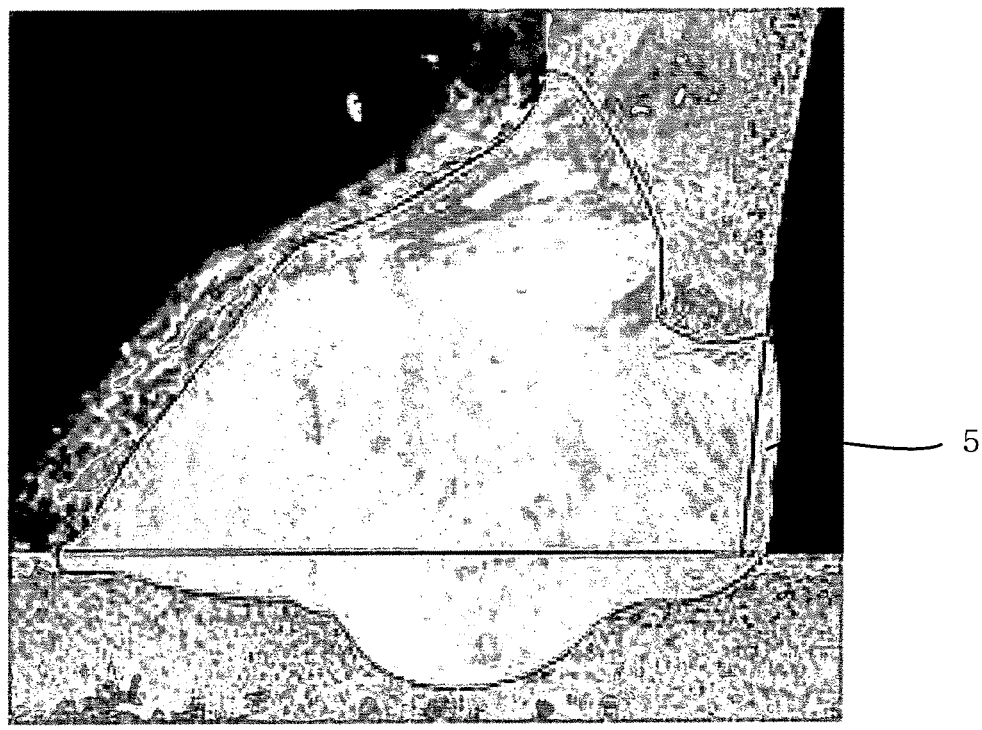
FIG. 6 is an enlarged cross-sectional view after a GMAW step according to the present invention.

FIG. 4A to 4C is an enlarged cross-sectional view of a reactor body and a portion of a half coil, FIG. 5 is an enlarged cross-sectional view after a temporarily welding step, and FIG. 6 is an enlarged cross-sectional view after a GMAW step according to the present invention. The method for welding a half coil of a reactor according to the present invention includes: a temporarily welding step of temporarily welding a half coil onto a circumferential surface of a reactor body; and a GMAW step of performing gas metal arc welding (GMAW) on the half coil after the temporary welding is finished, wherein the GMAW step is to perform welding to prevent a gap from forming between the half coil and the reactor body using the GMAW which supplies a wire of the same material as the reactor body using an automatic welding machine.

First, referring to FIG. 4A to 4C, FIG. 4A is a normal state that welding is performed the best since there is no gap between the reactor body and the half coil, FIG. 4B is a loop face state that it is difficult to form back beads after welding since an area of an end portion of the half coil is wide, and FIG. 4C is a burr state that it is difficult to form back beads due to burrs.

Therefore, when the half coil is processed in the normal state of FIG. 4A, the most preferred welding quality can be obtained.

The temporarily welding step is a step of temporarily attaching a half coil to the reactor body by temporarily welding. Through the temporary welding, a portion of the half coil is adhered onto the reactor body. As illustrated in FIG. 5, through the temporary welding, the inner surface of the half coil is welded in an incomplete penetration state that back beads are not formed. The GMAW step is a step of completely adhering the half coil, which is finished in temporary welding, through regular welding. In the step, a wire of the same material as the reactor body is supplied by an automatic welding machine. When the wire as an electrode changes a distance between the reactor body and the half coil to generate arc, so that the wire is melted. The molten wire fills up a gap between the reactor body and the half coil to form beads. As illustrated in FIG. 6, back beads with a sufficient amount are formed toward the inner surface of the half coil.

In the preferred embodiment of the present invention, the material of the reactor body may be made of a material of stainless steel (STS) 316L, and the supplied wire may be also made of a material of stainless steel (STS) 316L. As occasion demands, other wires of similar materials, such as STS 304 or STS 316, may be supplied.

Figure 7:
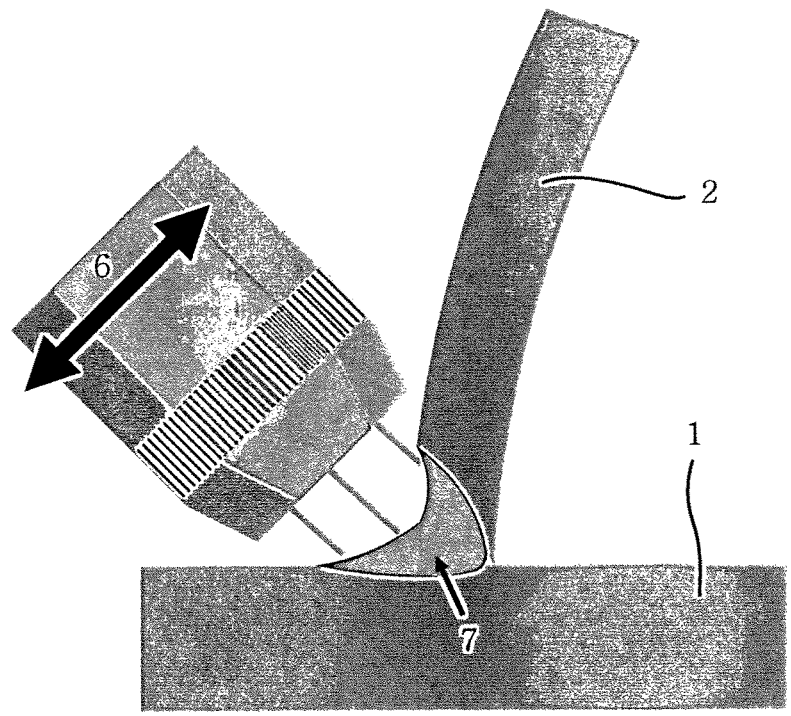
FIG. 7 is a view illustrating a general weaving operation of a nozzle.
Figure 8:
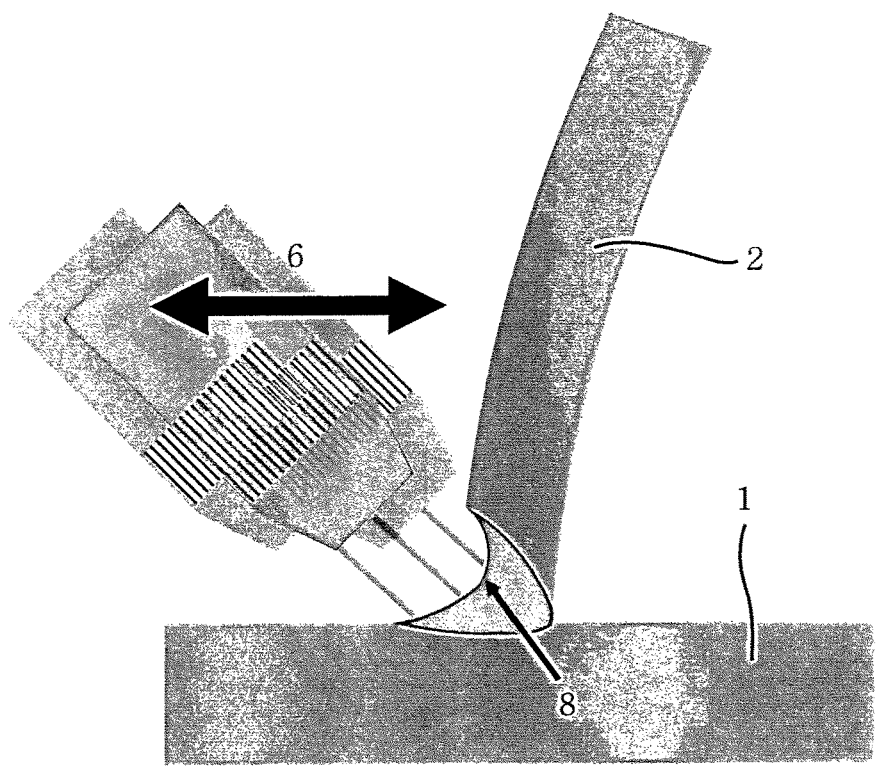
FIG. 8 is a view illustrating a weaving operation of a nozzle according to the present invention.

FIG. 7 is a view illustrating a general weaving operation of a nozzle, and FIG. 8 is a view illustrating a weaving operation of a nozzle according to the present invention. The gas metal arc welding (GMAW) is performed while performing a weaving operation at a constant width using a welding torch 9. In this instance, welding is performed while performing a weaving operation in a radial direction of the half coil 2.

Referring to FIG. 7, a general weaving operation using an automatic welding machine is performed while repeatedly moving the welding torch along the left and right sides of a welding line based on the welding line, thereby performing the weaving operation in the circumferential direction of the half coil 2. The weaving operation of the present invention is performed while repeatedly moving the welding torch in the longitudinal direction of the welding line, that is, in the axial direction of the reactor body 1, as illustrated in FIG. 8.

In other words, in the conventional weaving operation is performed in a direction perpendicular to the direction in which the welding torch 9 faces the welding line. However, the weaving operation according to the present invention is performed While maintain the direction in which the welding torch 9 faces the welding line and while the welding torch 9 repeatedly performs horizontal movement along the axial direction of the reactor body 1.

Through the weaving operation of the welding torch 9, an inertial force is acted to the wire molten by arc during welding, and so, a force that the wire as filler metal enters the gap between the half coil 2 and the reactor body 1 acts, thereby increasing a formation amount of back beads 5.

Furthermore, the weaving operation provides dwell time in a state in which the welding torch 9 becomes the closest to the half coil 2, thereby increasing a formation amount of back beads 5, and the delay time is between 0.1 and 0.5 seconds.

That is, the weaving operation of the welding torch 9 is performed at a frequency of about 2 to 3 Hz. So, the molten wire can be sufficiently filled up the gap between the reactor body 1 and the half coil 2 by providing the delay time in the state where the welding torch 9 is closest to the half coil 2. On the contrary, in a state in which the welding torch 9 is farthest from the half coil 2, there is no delay time or the minimum time of about 0.01 to 0.2 seconds is provided. So, the molten wire can prevent lots of beads from being formed at a portion which is farthest from the half coil.

Additionally, the GMAW may use argon gas as protective gas and base gas, and may use mixed gas containing 3 to 10 wt % of carbon dioxide ($CO_2$) in comparison to the total weight of the protective gas.

That is, like the general GMAW method, argon gas contains a certain amount of carbon dioxide, and mixed gas containing 3 to 10 wt % of carbon dioxide ($CO_2$) in comparison to the total weight of the protective gas is used to appropriately maintain the size and temperature of the arc, and thus the production amount of beads can also be uniformly maintained according to the supply speed of the wire.

Figure 9:
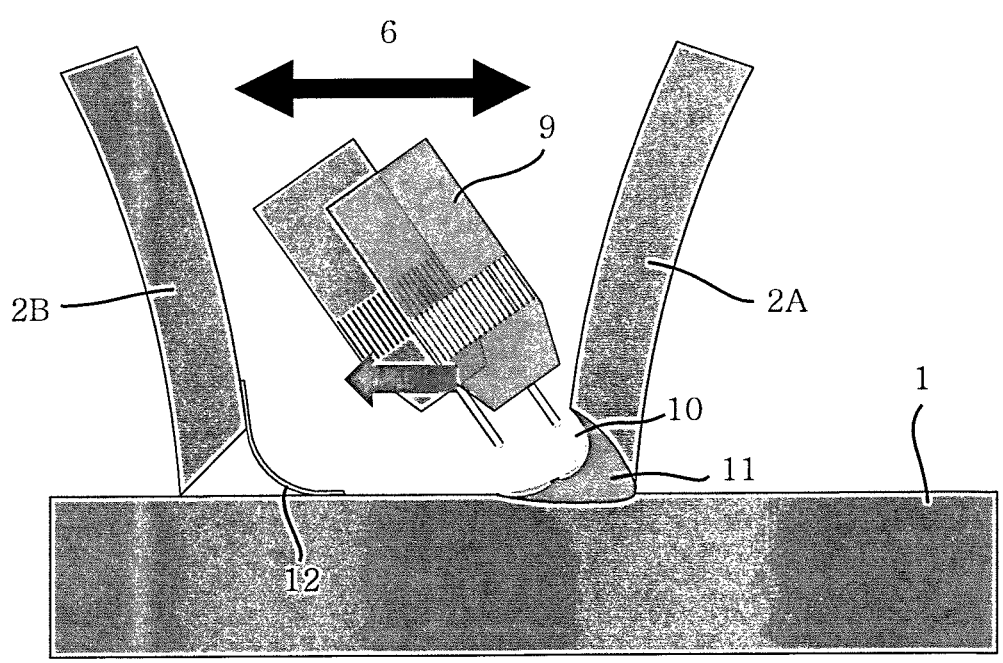
FIG. 9 is a diagram illustrating a use state of purging tape according to the present invention.

FIG. 9 is a diagram illustrating a use state of purging tape 12 according to the present invention. The GMAW is characterized in that purging tape 12 is adhered between the reactor body 1 and the half coil 2B, which is temporarily welded in proximity to the half coil 2A being welded actually, so as to prevent protective gas from leaking through a gap, thereby preventing oxidation of the welded portion.

That is, in a state in which the half coil to be attached to the reactor body is temporarily welded, the GMAW is performed. Since the temporarily welded half coil can be temporarily welded in a state in which a gap is formed between the reactor body and the half coil due to poor accuracy in dimension, a special purging tape may be used in order to prevent the protective gas from rapidly leaking through the gap.

In other words, the purging tape 12 is adhered along a bonding surface between the half coil 2B and the reactor body 1 so as to prevent the gap between the half coil and the reactor body that is temporarily welded, and in such a state, the GMAW is performed to prevent a welded portion from being oxidized due to the rapid leakage of the protective gas.

Here, it is preferable to use an aluminum tape as the purging tape 12. As occasion demands, a high heat-resistant paper tape may be adhered onto the inside, and an aluminum tape may be adhered onto the outside to use a double purging tape.

Furthermore, the automatic welding machine according to the present invention provides a welding line tracking function using a probe sensor commonly used in automatic welding machines. Spatters are adhered to a probe rod mounted in front of the probe sensor so as to interfere with the performance of the probe rod.

In the case of the spatters, a welding rod or a molten metal of a wire is not normally deposited on a welded portion base material but is scattered in all directions or is partially attached or slightly adhered around the base material in small lumps. Therefore, it may cause a defect, and it is not easy to periodically remove such spatters.

Therefore, in the present invention, the probe rod is not made of the STS material but is made of copper to make a difference in materials. In addition, the present invention can reduce generation of spatters when the wire supplied together with the base material is melted are adhered on the probe rod.

Finally, according to the present invention, the method for welding a half coil of a reactor performs the gas metal arc welding (GMAW) along a half coil temporarily welded to a welding machine body using an automatic welding machine to increase a formation amount of back beads, thereby increasing coupling strength of the half coil, increasing airtightness of a fluid flowing along the half coil, securing uniform welding quality by automatic welding, increasing productivity, and reducing production costs. Moreover, the method for welding a half coil of a reactor according to the present invention can perform welding while performing a weaving operation of a welding nozzle at a constant width in a radial direction of a half coil, thereby increasing a formation amount of back beads. Furthermore, the method for welding a half coil of a reactor according to the present invention provides dwell time in a state in which the welding nozzle approaches the half coil proximately, thereby increasing a formation amount of back beads. Additionally, the method for welding a half coil of a reactor according to the present invention includes purging tape adhered between the half coil, which is temporarily welded in proximity to the half coil being welded actually, and the reactor body to prevent protective gas from leaking through a gap, thereby preventing oxidation of the welded portion.

What is claimed is:

1. A method of welding a half coil of a reactor, comprising:
   a temporarily welding step of temporarily welding a half coil onto a circumferential surface of a reactor body; and
   a gas metal arc welding (GMAW) step of performing the GMAW on the half coil after the temporary welding is finished,
   wherein the GMAW step is to perform welding to prevent a gap from forming between the half coil and the reactor body using the GMAW which supplies a wire of the same material as the reactor body using an automatic welding machine,
   wherein the gas metal arc welding (GMAW) is performed while performing a weaving operation at a constant width using a welding torch, and welding is performed while performing the weaving operation in a radial direction of the half coil, and
   wherein the weaving operation provides dwell time in a state in which the welding torch becomes the closest to the half coil to increase a formation amount of back beads on an opposite side of the GMAW, and the dwell time is between 0.1 and 0.5 seconds.

2. The method according to claim 1, wherein the GMAW uses argon gas as protective gas and base gas, and uses mixed gas containing 3 to 10 wt % of carbon dioxide ($CO_2$) in comparison to the total weight of the protective gas.

3. The method according to claim 1, wherein the GMAW is provided with purging tape adhered between the reactor body and the half coil, which is temporarily welded in proximity to the half coil being welded actually, so as to prevent protective gas from leaking through the gap, thereby preventing oxidation of the welded portion.

* * * * *